United States Patent [19]

McVey

[11] Patent Number: 4,947,101

[45] Date of Patent: Aug. 7, 1990

[54] DIGITAL SWITCHING VOLTAGE REGULATOR

[75] Inventor: Michael J. McVey, Manhattan Beach, Calif.

[73] Assignee: Hughes Aircraft Company, Los Angeles, Calif.

[21] Appl. No.: 244,186

[22] Filed: Sep. 11, 1988

[51] Int. Cl.$^5$ .............................................. G05F 1/46
[52] U.S. Cl. ..................................... 323/272; 323/284
[58] Field of Search ............... 323/271, 272, 282, 283, 323/284, 906

[56] References Cited

U.S. PATENT DOCUMENTS

| 3,521,150 | 7/1970 | Bates | 323/272 |
| 4,186,336 | 1/1980 | Weinberg et al. | 323/27 X |
| 4,622,511 | 11/1986 | Moore | 323/272 X |
| 4,812,737 | 3/1989 | Fleck | 323/271 |

OTHER PUBLICATIONS

Fleck et al., "10Kw Solar Array Switching Unit Performance Test Results", Proceedings of 20th Intersociety Energy Conversion Engineering Conference, 1985.

Primary Examiner—Steven L. Stephan
Assistant Examiner—Kristine Peckman
Attorney, Agent, or Firm—Robert A. Westerlund; Steven M. Mitchell; W. K. Denson-Low

[57] ABSTRACT

An improved digital switching voltage regulator 10 for providing a regulated voltage having a well defined steady state ripple component is disclosed herein. The improved voltage regulator 10 of the present invention includes a control circuit 25 for providing a first output voltage and at least one shift pulse when the voltage across a load 21 operatively coupled to the regulator 10 departs from a voltage regulation window by crossing an upper threshold voltage thereof. The control circuit 25 also provides a second output voltage and at least one shift pulse when the load voltage departs from the voltage regulation window by crossing a lower voltage threshold thereof. A bi-directional shift register 50 generates a set of control voltages in response to the output voltage of the control circuit 40 and the shift pulse. Current is provided to the load 21 by an array 70 of switchable current sources in response to the set of control voltages.

16 Claims, 4 Drawing Sheets

DIGITAL SWITCHING VOLTAGE REGULATOR

BACKGROUND OF THE INVENTION

1. Field of the Invention:

The present invention relates to voltage regulators. More specifically, the present invention relates to digital switching voltage regulators.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Analog and digital switching voltage regulators are known in the art. In analog switching regulators the current shunted by a switch is proportional to the difference between an existing load voltage and a desired load voltage. The current shunting switch in analog regulators is typically a transistor operating in the linear mode. In certain applications the often high power consumption of analog regulators is reduced by "tapping" a power supply at less than the available supply voltage. In this manner the voltage across the transistor switch is reduced thereby reducing power consumption. However, this reduction in the transistor operating point voltage induces a corresponding reduction in the amount of power ($V_{TAP} * I$) which may be shunted by the transistor prior to saturation thereof. Hence, the regulation range of the analog regulator is limited in proportion to this reduction in power handling capability.

In contrast, conventional digital regulators are not typically so limited in current or power handling capability. Conventional digital switching regulators effect regulation within adjacent voltage "windows" centered about voltage setpoints sequentially offset from the desired load voltage. These regulators include an array of modules each having a window comparator centered about one of the setpoints. Each module typically includes a power supply (e.g., a current source) and a current shunt switch controlled by the window comparator. The array of modules is then connected in parallel with a load.

This conventional digital approach is generally expensive to implement as each switch requires an associated window comparator. Further, the voltage setpoints about which the window comparators within each module are centered are typically provided by a central amplifier. Hence, failure of this central amplifier results in a complete loss of regulation capability. This risk may be unacceptable in applications such as spacecraft load (bus) voltage regulation which require a high degree of reliability.

An alternative digital switching regulator utilizing a shift register has recently been developed which overcomes the limitations mentioned above in connection with conventional digital switching regulators. Specifically, in an article entitled "10 kW Solar Array Switching Unit Performance Test Results", published in the Proceedings of the 20th Intersociety Energy Conversion Engineering Conference in 1985, Fleck et al. disclosed a 'voltage controlled solar array'. The regulator developed by Fleck includes an array of solar panels (current sources) connected to an array of shunt switches. The solar panels and shunt switches are connected in parallel with a load. When turned on, a given shunt switch diverts to ground the current from the solar panel connected thereto. Individual data registers within a shift register are operatively coupled to the shunt switches. A logic one or zero within each of the data registers turns the associated switch on or off, respectively. A comparator monitors the load voltage and compares it with a desired reference voltage to generate a logic signal which is used to control the shift register and hence the shunt switches. Data within the shift register is updated in accordance with the logic signal in response to the application of a clock signal to the shift register. In this manner a relatively constant voltage is maintained across the load despite changes in the impedance or current requirements thereof.

In the regulator developed by Fleck, the array of switches is controlled by a shift register and a single comparator. This implementation is more economical than that of the conventional digital switching regulators which have a comparator associated with each switch.

However, in the regulator of Fleck both the clock signal and the logic signal generated by the comparator are continuously applied to the shift register. As a consequence, at least one bit within the shift register will change with each clock cycle even when the instantaneous bus voltage is substantially identical to the desired bus voltage. In this manner at least one switch changes state with every clock cycle even in the presence of a constant (steady state) bus current draw. This somewhat random switching results in an unpredictable, nonuniform ripple voltage and can increase power dissipation in the shunt switches.

Further, where the ability to accommodate large changes in bus current draw is desired, a number of the regulators developed by Fleck may need to be combined in parallel. However, since one switch within each regulator changes state with each clock pulse, approximately as many switches as the number of regulators combined in parallel changes state with each clock pulse. These essentially independent switch state changes may lead to unpredictable bus voltage transients in such a parallel arrangement of regulators.

In addition, when combined in parallel the regulators developed by Fleck would generally have staggered reference voltages (setpoints) so as not to mutually interfere. These setpoints should be located as close as possible to the setpoint associated with the desired bus voltage so as to minimize bus voltage variation. However, the setpoints also need to be adequately spaced to prevent the ripple voltages from regulators with adjacent reference voltages from interacting and possibly growing to unstable proportions. As mentioned above, the amplitude of the ripple voltage within the regulators of Fleck is not well defined. Hence, in a parallel connection of the regulators developed by Fleck the regulator setpoints may not be able to be positioned sufficiently near the desired bus voltage to reduce bus voltage variations to acceptable levels for certain applications.

Hence, a need in the art exists for a digital switching voltage regulator which provides a regulated voltage having a relatively small, well defined ripple component.

SUMMARY OF THE INVENTION

The need in the art for a digital switching voltage regulator which provides a regulated voltage having a relatively small, well defined ripple component is addressed by the improved digital switching voltage regulator of the present invention. The improved regulator of the present invention includes a control circuit for providing a first output voltage and at least one shift pulse when the voltage across a load operatively coupled to the regulator departs from a voltage regulation window by crossing an upper threshold voltage thereof. The control circuit also provides a second output voltage and at least one shift pulse when the load voltage departs from the voltage regulation window by crossing a lower threshold thereof. A bi-directional shift register generates a set of control voltages in response to the output voltage of the control circuit and the shift pulse. Current is provided to the load by an array of switchable current sources in response to the set of control voltages.

DETAILED DESCRIPTION OF THE INVENTION

Figure 1:
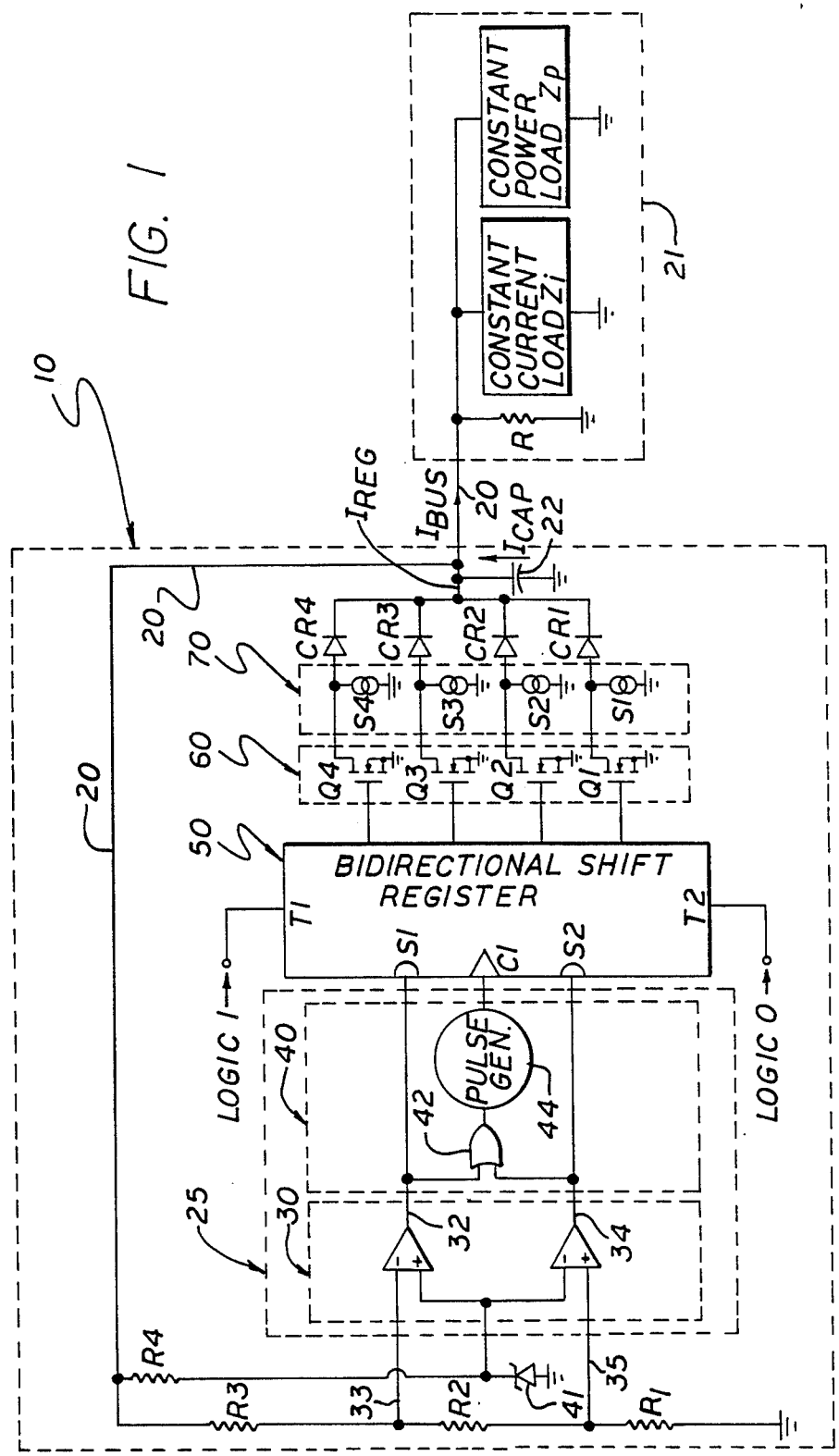
FIG. 1 is a block diagram representation of a preferred embodiment of the improved digital voltage regulator of the present invention.

FIG. 1 shows a block diagram representation of a preferred embodiment of the improved digital switching regulator 10 of the present invention. The improved regulator 10 is operative to maintain a substantially constant voltage on a bus (signal line) 20 in response to changes in the current ($I_{bus}$) drawn by a bus load 21 connected thereto. In particular, a capacitor 22 within the regulator 10 compensates for immediate changes in $I_{bus}$ by absorbing or supplying a current $I_{cap}$. The capacitor current $I_{cap}$ induces a change in the charge stored on the capacitor 22 and hence leads to a corresponding change in the voltage on the bus 20. The regulator 10 of the present invention senses variations in the voltage on the bus 20 and adjusts the regulator current $I_{reg}$ to the load 21 and capacitor 22 accordingly. In this manner the voltage across the capacitor 22, and therefore on the bus 20, is held relatively constant notwithstanding variations in $I_{bus}$.

Although the present invention will be described in more detail below, the following brief operational description is included to enhance understanding of the remainder of the specification. As shown in FIG. 1, the regulator 10 of the present invention includes a control circuit 25 which is responsive to deviations in the voltage on the bus 20 from a desired voltage regulation range. More specifically, the control circuit 25 includes a window comparator 30 and a controllable pulse generator 40. The comparator 30 compares a portion of the voltage on the bus 20 with a voltage provided by a diode 41. When the difference between this bus voltage sample and the reference voltage exceeds a differential voltage the output voltage of the comparator 30 changes accordingly. Specifically, the comparator 30 raises the lines 32 and 34 to a logic 1 for bus voltages below and above, respectively, the desired bus voltage regulation range.

When the line 32 (34) is raised, a logic 1 (0) is transferred into a bi-directional shift register 50. Following this transfer, a shift pulse generated by the pulse generator 40 is applied to the register 50. Application of this pulse results in transistor switches within a switch array 60 being turned on or off in accordance with data stored in the register 50. When turned on, switches Q1, Q2, Q3 and Q4 shunt current from current sources S1, S2, S3 and S4 included within a current source array 70 away from the bus 20 and load 21. Thus, the current output of the regulator 10 is varied in response to changes in the voltage on the bus 20. In this manner the regulator 10 regulates the voltage on the bus 20 by adjusting the current $I_{reg}$ such that the voltage across the capacitor 22 remains relatively constant despite changes in $I_{bus}$.

As shown in FIG. 1, the voltage drop across a zener diode 41 provides the comparator 30 with a reference voltage. The reference may be provided by a single element or a plurality of same. For example, with a nominal bus voltage of 30 V the diode 41 typically generates a 19.2 V reference voltage. The 19.2 V reference voltage is realized by a serial connection of three 6.4 V temperature compensated reference Zener diodes. Diodes meeting the above requirements may be obtained from a manufacturer such as Motorola under the part number IN4569A.

In the embodiment of FIG. 1 the voltage on the bus 20 is divided by the resistors R1, R2 and R3 and sampled by the comparator 30 via input lines 33 and 35. As the voltage dropped across R2 is equivalent to the voltage difference between the lines 33 and 35, the magnitude of the voltage drop across R2 defines the differential voltage applied to the comparator 30. The magnitude of this differential voltage is determined by the bus voltage and the value of R2 relative to R1 and R3. The value of resistor R1 is chosen such that this differential input voltage is centered at the voltage provided by the reference 41. Changes in the voltage of the bus 20 induce corresponding changes in the voltages on the lines 33 and 35 relative to the reference voltage. In this manner the resistors R1, R2 and R3 are chosen to allow the comparator 30 to sense changes in the bus voltage relative to the voltage generated by the reference 41.

The comparator 30 is utilized to signal departures in the bus voltage from a desired bus voltage regulation window. The window is bounded by upper and lower threshold voltages. In particular, the output voltage of the comparator 30 changes when the bus voltage departs from the regulation window by crossing the upper or lower threshold voltage thereof. Specifically, the comparator 30 raises the line 32 or the line 34 to a logic 1 when the line 33 falls below, or the line 35 rises above, respectively, the reference voltage by the differential threshold voltage of the comparator 30. In the embodiment of FIG. 1 this differential voltage is approximately 100 mV. The value of R2 relative to R1 and R3 determines the degree of bus voltage variation from the desired bus voltage (i.e. the span of the regulation window) which will induce such a 100 mV comparator input voltage. Hence, the resistors R1, R2, and R3 determine the upper and lower threshold voltages of a voltage regulation window monitored by the comparator 30. The comparator 30 may be realized by a variety of commercially available integrated circuit (IC) window comparators. The LM139 comparator manufactured by Fairchild is an example of one such IC comparator.

The controllable pulse generator 40 is operative to pulse the bi-directional shift register 50 in response to actuation by the comparator 30. In particular, the controllable pulse generator 40 includes a conventional CMOS 4001B OR gate 42 and a clocked pulse generator 44. The input of the OR gate 42 is coupled to the outputs of the comparator 30 via the lines 32 and 34. The OR gate 42 provides an enable signal to the clocked generator 44 in response to the presence of a logic 1 on either of the lines 32 or 34. When enabled by the enabling signal from the gate 42, the clocked generator 44 supplies a series of equally spaced pulses to the shift register 50. Those skilled in the art will appreciate that the clocked pulsed generator 44 may be realized with a conventional RC oscillator and a comparator.

In the embodiment of FIG. 1, the bi-directional shift register 50 includes four serially arranged data registers (not shown) which allow control of switches Q1, Q2, Q3, and Q4 included within the switch array 60. The shift register 50 is coupled to the lines 32 and 34 at input ports S1 and S2, respectively. As mentioned above, data is shifted between the registers included within the shift register 50 in response to the application of a logic 1 to line 32 or line 34. More specifically, as the voltage on the bus 20 increases beyond the bounds of a desired bus voltage window, a logic 1 will be applied to the lower line 34 and data will be shifted in the register 50 towards terminal T2. Concurrent with this data shift a logic 1 will be loaded into the register 50 at terminal T1. Similarly, bus voltage decreases of sufficient magnitude relative to a desired bus voltage trigger the comparator 30 apply a logic 1 to the upper line 32 and thereby induce data within the register 50 to be serially shifted towards the terminal T1. Further, a logic 0 is loaded into the register 50 at the terminal T2 as data is shifted toward terminal T1. Hence, data is shifted within the register 50 in response to bus voltage fluctuations which exceed a voltage regulation window. Various commercially available 4 bit bi-directional shift registers such as the CD40194 manufactured by National Semiconductor may be utilized to serve as the register 50.

As shown in FIG. 1, the register 50 may also be addressed by the controllable pulse generator 40 via input port C1. Pulses received by the register 50 at the port C1 enable the switches Q1, Q2, Q3 and Q4 to access data stored within the register 50. As mentioned above, the pulse generator 40 provides a pulse to the register 50 in response to either of the lines 32 or 34 being raised to a logic 1. In this manner the switch register 50 allows the switches Q1, Q2, Q3 and Q4 to have access to data stored therein, and hence to potentially change state, only after the line 32 or 34 has been raised. The net effect is that the register 50 allows the switches Q1, Q2, Q3 and Q4 to change states from on or off only after the voltage on the bus 20 has departed from the bus voltage regulation window defined by the comparator 30. This selective control of the switch array 60 is in marked contrast to the system developed by Fleck mentioned in the Background of the Invention wherein a pulse train is continuously applied to a shift register irrespective of the instantaneous bus voltage. This causes at least one switch connected to the shift register to change state with every pulse, thereby generating a nonperiodic bus ripple voltage of potentially increased magnitude.

The switches Q1, Q2, Q3 and Q4 included within the switch array 60 are controlled by the shift register 50 and fed by power supplies S1, S2, S3 and S4, respectively. In the embodiment of FIG. 1 the switches Q1, Q2, Q3 and Q4 comprise field effect transistors (FETs). Commercially available FETs such as the IRF 150 FET (40 amp, 100 volt) manufactured by International Rectifier or bipolar transistors of similar voltage and current ratings afford adequate current handling capability and low saturation drop to minimize shunt switch power dissipation. As may be evident upon inspection of FIG. 1, each of the switches Q1, Q2, Q3 and Q4 is controlled by one of the four data registers included within the shift register 50. That is, the presence of a logic 1 (0) within a particular data register induces the switch within the array 60 coupled thereto to be turned on (off). In this manner current from the power supplies S1, S2, S3 and S4 is either shunted to ground by the switches Q1, Q2, Q3 and Q4 or fed to the load 21 in response to data stored within the register 50.

As shown in FIG. 1 the current sources S1, S2, S3 and S4 included within the array 70 are connected to the load 21 through the diodes CR1, CR2, CR3 and CR4. The current sources S1, S2, S3 and S4 are of conventional design and are chosen to provide current sufficient to satisfy the expected variation in $I_{bus}$. For example, in spacecraft applications the current source array 70 may be realized by a photovoltaic solar panel array large enough to accommodate the current requirements of devices in communication with the spacecraft bus. In operation, the number of current sources in the array 70 furnishing $I_{reg}$ at any instant is determined by the number of switches in the switch array 60 turned off. Hence, the current source array 70 provides a controllable source of current for the bus load 21.

The diodes CR1, CR2, CR3 and CR4 prevent the voltage across the switches Q1, Q2, Q3 and Q4 from being impressed upon the load 21 while the switches Q1, Q2, Q3 and Q4 are conducting current. That is, while one of the switches within the array 60 is shunting current from one of the supplies within the array 70, the diode CR1, CR2, CR3 or CR4 connected to the particular switch and supply drops substantially all of the voltage present across the load 21. Conversely, while the load 21 and bus 20 are being provided current by one of the supplies S1, S2, S3 or S4, the voltage drop across the diode CR1, CR2, CR3 or CR4 coupled to this supply is approximately 0.7 volts. In this manner the diodes CR1, CR2, CR3 and CR4 buffer the load 21 from the switch array 60 and current source array 70.

The load 21 includes a resistive load R, a constant current load $Z_i$ and a constant power load $Z_p$. The loads R, $Z_i$ and $Z_p$ model the three types of loads likely to be connected to the bus 20. The loads R, $Z_i$ and $Z_p$ each behave differently with respect to changes in the voltage on the bus 20. For example, a decrease in bus voltage induces a decrease in the current drawn by the load R, does not affect the current drawn by the load $Z_i$, and causes an increase in the current drawn by the load $Z_p$. The bus current $I_{bus}$ may be altered by the electrical connection or disconnection to the bus 20 of devices having any of the three loading characteristics described above. Although the timing diagrams discussed below are described with reference to changes in the current drawn by the load $Z_i$, it is understood the regulator 10 of the present invention is disposed to regulate the voltage on the bus 20 equally well with respect to changes in the resistance of the load R or in the power consumption of the load $Z_p$.

Figure 2:
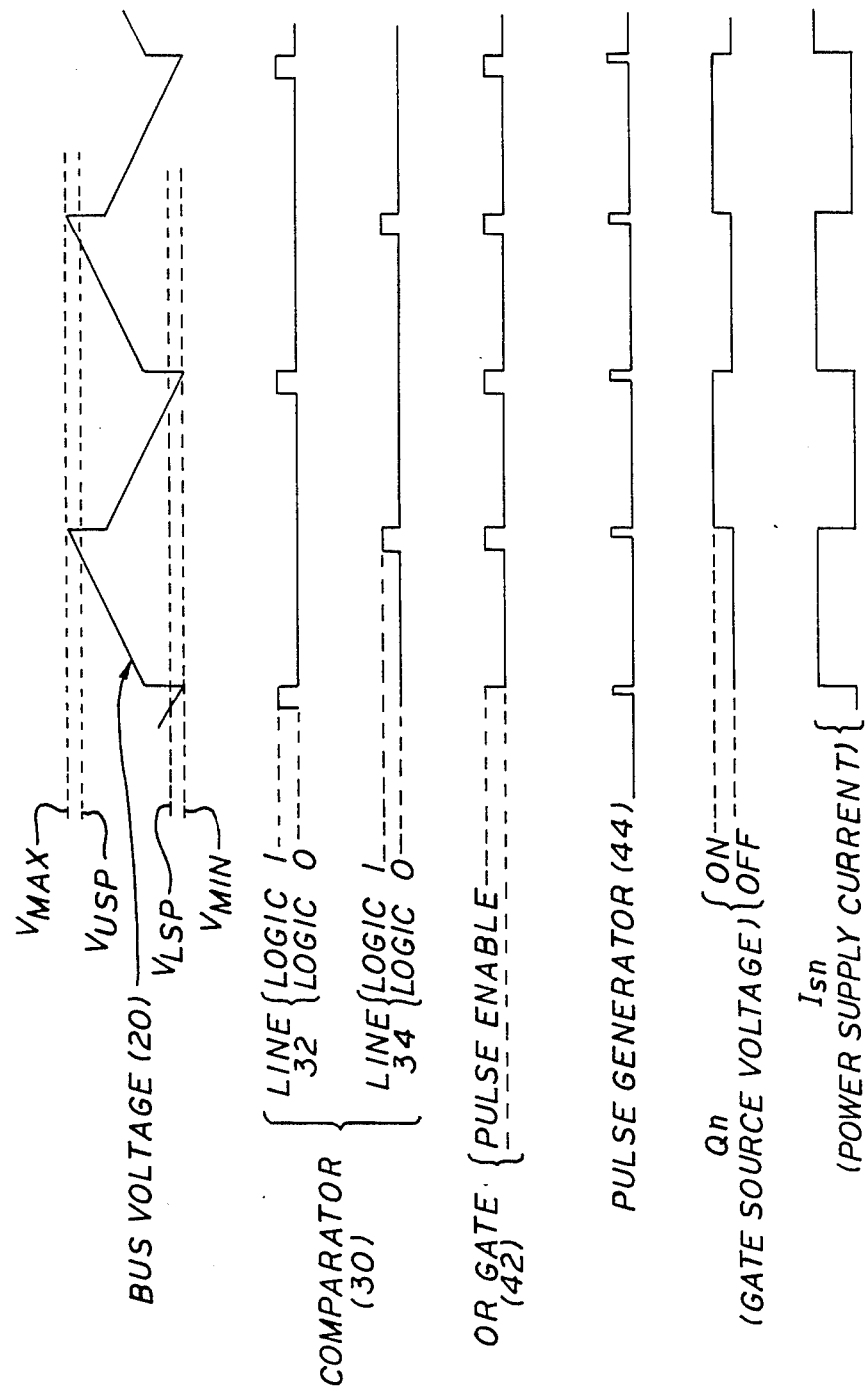
FIG. 2 is a timing diagram which illustrates the steady state operation of the regulator of the present invention in response to a constant bus current $I_{bus}$.

FIG. 2 is a timing diagram which shows the steady state response of the regulator 10 to a constant bus current load. As shown in FIG. 2, the voltage on the bus 20 varies periodically within a desired bus voltage window defined by the upper and lower bus threshold voltages $V_{max}$ and $V_{min}$. The voltages $V_{usp}$ and $V_{lsp}$ are the bus voltages at which the comparator 30 is triggered to raise the lines 32 and 34 to a logic 1, respectively. As discussed above, the voltages $V_{usp}$ and $V_{lsp}$ can be adjusted with the resistors R1, R2 and R3.

While the regulator 10 is operating in the steady state, three of the four switches Q1, Q2, Q3 and Q4 will typically remain on or off until a change occurs in $I_{bus}$. The number of switches in the switch array 60 turned on or off in the steady state depends in the steady state value of the desired, preselected voltage on the bus 20 and on the particular steady state current $I_{bus}$. For relatively larger (smaller) steady state bus currents $I_{bus}$, the array 60 will include proportionately more switches turned permanently off (on) pending a change in $I_{bus}$. Further, the remaining fourth switch in the array 60 (denoted by Qn in FIG. 2) will turn on and off as the bus voltage reaches $V_{max}$ and $V_{min}$, respectively. The maximum frequency of the steady state ripple voltage on the bus 20, and therefore one half of the maximum switching frequency of Qn, is given by the expression:

$$f_{max}=1/[2*(C*(V_{max}-V_{min})-Isn*Resr)/(Isn/2)] \qquad [1]$$

where,
$f_{max}$=maximum ripple voltage frequency
C=capacitance of the capacitor 22
$V_{max}$=upper bound of bus voltage window
$V_{min}$=lower bound of bus voltage window
Isn=current to the load 21 and capacitor 22 from supply (S1, S2, S3 or S4) coupled to Qn
Resr=equivalent series resistance of the capacitor 22.

As shown in FIG. 2, the OR gate 42 sends a pulse enable signal to the pulse generator 44 in response to the application of a logic 1 to either the upper line 32 or the lower line 34. Data within the register 50 is serially shifted concurrent with the generation of the pulse enable signal. The pulse generator 44 delivers a pulse to the shift register 50 after some time delay (nominally 5 microseconds in the preferred embodiment) after receiving the pulse enable signal. The time delay is built into the pulse generator 44 to allow information within the register 50 to settle after being serially shifted. As is evident from FIG. 2, Qn changes state immediately after the register 50 is pulsed by the generator 44. Accordingly, the current Isn to the load from the supply coupled to Qn either turns on or off depending on the state change of Qn. In short, while in the steady state, the regulator 10 supplies current to the load 21 until the voltage on the bus approaches $V_{max}$. This current is then reduced by turning on Qn which allows discharge of the capacitor 22 and results in the voltage on the bus 20 dropping to near $V_{min}$. Current is then again increased to the load 21 by turning off Qn. In this manner Qn is switched at a rate necessary to constrain the bus voltage to remain within $V_{max}$ and $V_{min}$, thereby providing a periodic and predictable bus ripple voltage.

As should be obvious from the above, the frequency of the bus ripple voltage is related to the value of the capacitor 22. In a preferred embodiment of the regulator 10 having a nominal bus voltage of 30 V, the capacitor 22 is chosen to be on the order of 3000 mF.

Figure 3:
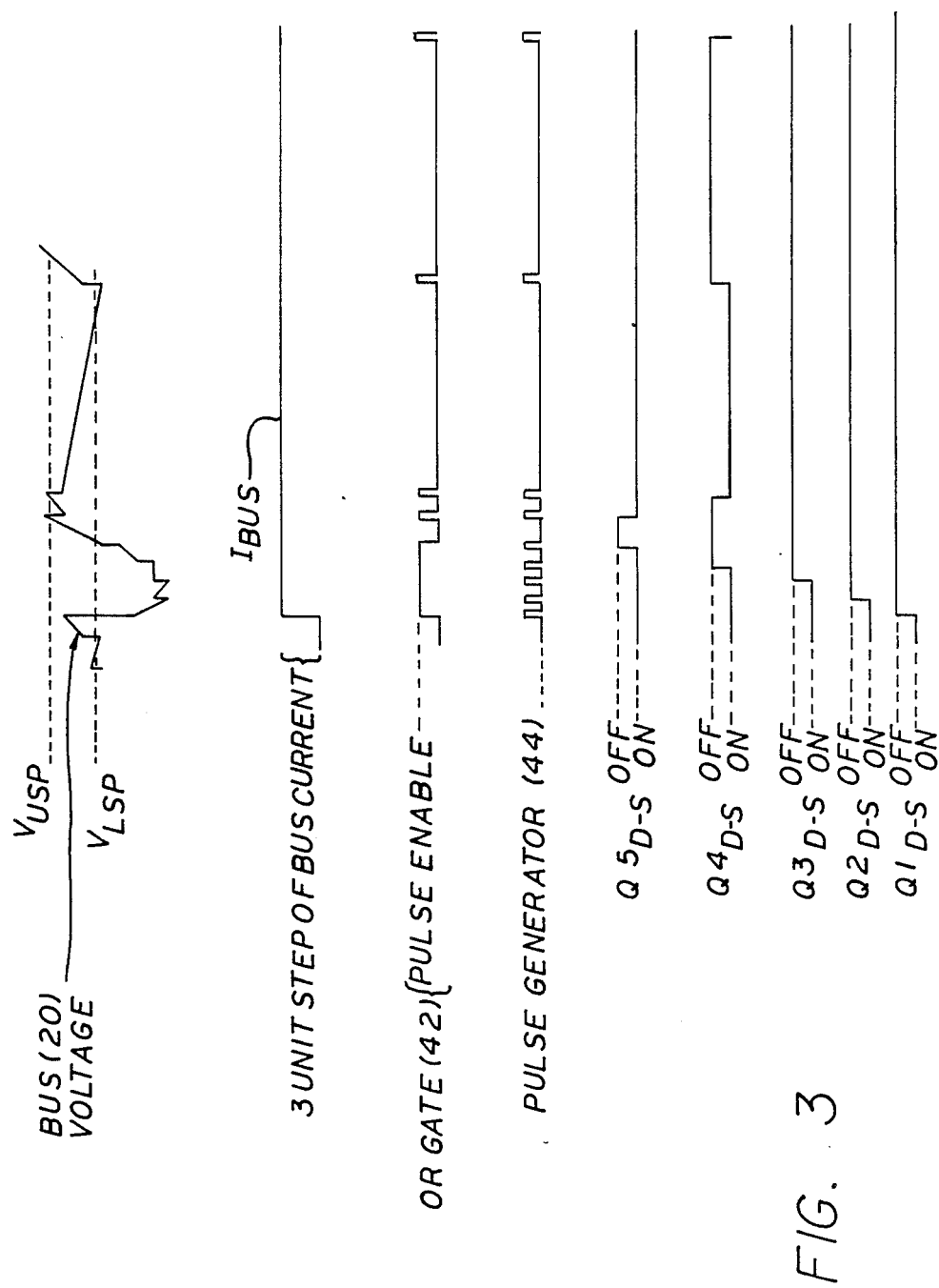
FIG. 3 is a timing diagram which illustrates the transient response of a preferred embodiment of the present invention in response to a step change in bus current $I_{bus}$.

FIG. 3 is a timing diagram which illustrates the transient response of a modified version of the system 10 to a three unit step increase in the current drawn by the load $Z_i$ which induces a three unit step increase in $I_{bus}$. The response in FIG. 3 corresponds to a modified version of the system 10 wherein the 4 bit register 50 has been replaced by a 5 bit bi-directional shift register 50'. Additionally a fifth transistor switch Q5, current source S5 and diode CR5 have been added in a parallel connection substantially identical to the respective connections of the elements Q1, Q2, Q3 and Q4; S1, S2, S3 and S4; and CR1, CR2, CR3 and CR4. A three unit step current increase corresponds to the maximum current available from three of the supplies in the current source array 70.

As shown in FIG. 3, the voltage on the bus 20 instantaneously drops below $V_{lsp}$ following the step increase in $I_{bus}$ and the associated discharge of current from the capacitor 22 through the equivalent series resistance thereof. This drop in bus voltage causes the line 32 (FIG. 2) to be raised and hence results in a logic 0 being loaded into the register 50'. The presence of a logic 1 on the line 32 concurrently induces the OR gate 42 to impress a pulse enable signal on the pulse generator 44. The pulse generator then provides a first pulse to the register 50' which allows the logic 0 loaded previously to turn off the switch Q1. As shown in FIG. 3, the drain to source voltage of Q1 increases upon being turned off. As the increased current provided to the load 21 by S1 following the turning off of Q1 is insufficient to raise the voltage on the bus 20 above $V_{lsp}$, the line 32 and the pulse enable signal remain high which induces an additional logic 0 to be loaded into the register 50' and a second pulse to be applied to the register 50'. As shown in FIG. 3 this process continues until $I_{reg}$ becomes adequate to raise the bus voltage above $V_{usp}$. When the bus voltage exceeds $V_{usp}$ the line 34 is raised, a logic 1 is loaded into register 50', and Q5 is turned on following pulsing of the register 50' by the generator 44. After Q5 is turned on, the regulator 10 proceeds to operate in the steady state mode illustrated in FIG. 2. In this manner the regulator 10 efficiently returns to steady state operation following relatively large changes in the bus current $I_{bus}$.

As is implied by FIG. 3, the frequency of the pulse train provided by the generator 44 is proportional to the rate at which the bus voltage returns to the desired regulation range. It is also seen in FIGS. 2 and 3 that the steady state bus ripple voltage is independent of the frequency of the pulse generator 44. It is therefore a feature of the present invention that the frequency of the pulse generator may be selected to optimize the transient response of the regulator 10 without affecting the steady state bus ripple voltage. In contrast, as mentioned in the Background of the Invention other digital switching regulators utilize a clock which regularly pulses a shift register irrespective the value of an instantaneous bus voltage. Hence, in these regulators the frequency of the steady state bus ripple voltage is essentially equivalent to the clock frequency. This substantially prevents separate optimization of the clock frequency for transient and steady state response.

Figure 4:
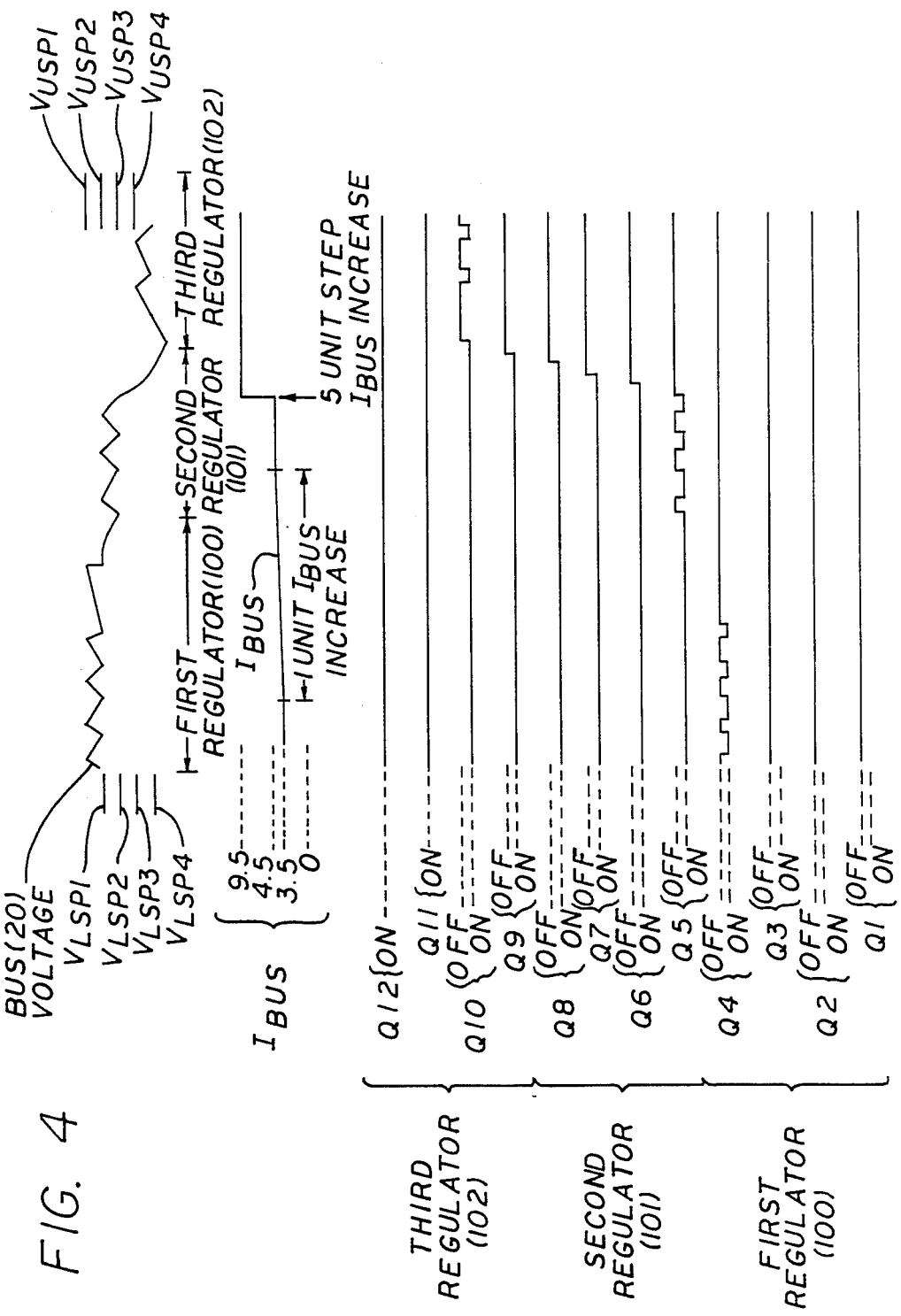
FIG. 4 is a timing diagram illustrating the response of a parallel connection of the regulators of the present invention to variations in current $I_{bus}$ drawn the by the bus 20.

In certain applications wherein the bus current $I_{bus}$ is subject to substantial variation, several of the regulators 10 of the present invention may need to be connected in parallel to the load 21. That is, the current sourcing capacity of a single regulator 10 may be inadequate to provide a large bus current $I_{bus}$ while simultaneously providing the requisite capacitor current $I_{cap}$ necessary to sufficiently charge the capacitor 22 to the desired bus voltage. As an example of such a parallel connection, FIG. 4 shows the response of a parallel connection of three of the regulators 10 of FIG. 1 to a widely varying bus current $I_{bus}$. These three regulators will be referred to as a first, second and third regulator 100, 101 and 102, respectively. As shown in FIG. 4, the voltage regulation windows of the first, second and third parallel connected regulators 100, 101 and 102 are denoted by $V_{spi}-V_{lspi}$ where i=1, 2 and 3, respectively. The individual bus voltage regulation windows are offset so as to avoid mutual interference between the first, second and third regulators 100, 101 and 102. As was mentioned previously, the DC offset and span of the regulation windows may be selected by adjusting the resistors R1, R2 and R3 included within each of the regulators 100, 101 and 102. As is evident from FIG. 4, the composite regulation window of the parallel connection of the first, second and third regulators 100, 101 and 102 approximately corresponds to $V_{uspl}-V_{lsp4}$.

Specifically, FIG. 4 shows the variation in voltage on the bus 20 in response to a gradual unit ramp increase in $I_{bus}$ followed by a five unit step increase in $I_{bus}$. Again, in this example the increase in $I_{bus}$ is due to an increase in the current drawn by the load $Z_i$. Further, a unit increase in $I_{bus}$ is equivalent to the current available from a single current source within the current source array 70 (FIG. 1). Also shown in FIG. 4 are the drain to source voltages of transistor switches Q1 through Q12, a high drain to source voltage indicating that the switch is turned off. Switches Q1 through Q4 are included within the first regulator 100, switches Q5 through Q8 are included within the second regulator 101 and switches Q9 through Q12 are included within the third regulator 102.

In the diagram of FIG. 4 $I_{bus}$ is initially held constant at 3.5 units and the bus voltage varies in a steady state manner between $V_{uspl}$ and $V_{lspl}$. In this initial state Q1 through Q3 are off allowing three units of current to be supplied by sources S1 through S3. The remaining one half unit of $I_{bus}$ and the requisite $I_{cap}$ are supplied by S4 when Q4 is periodically turned off. Q5 through Q12 are initially turned on thereby shunting to ground current from the current sources associated therewith. As $I_{bus}$ is gradually increased to 4.5 units, Q4 is held in the off state and Q5 is intermittently turned off to supply additional current to the bus 20. Hence, the increase in $I_{bus}$ to 4.5 units has resulted in instantaneous control of the bus voltage being transferred from the first regulator 100 to the second regulator 101.

Upon the bus current draw increasing 5 units to 9.5 units, the bus voltage exhibits a transient response similar to that of FIG. 3. Specifically, switches Q5 through Q9 are sequentially turned off allowing 5 additional units of current to flow to the bus 20. Q10 then toggles between states to supply the remaining portion of $I_{bus}$ and the $I_{cap}$ required by the capacitor 22 to constrain the bus voltage to remain between $V_{usp4}$ and $V_{lsp4}$. Thus, the five unit step increase in $I_{bus}$ results in control of the ensuing steady state bus voltage passing from the second regulator 101 to the third regulator 102. In this manner preferred embodiments 100, 101 and 102 of the regulator of the present invention may be arranged in parallel to increase the range of current which may be drawn by the bus 20. It is a feature of the present invention that the well defined steady state bus ripple voltages of the regulators 100, 101 and 102 allow the respective regulation windows associated therewith to be offset in close proximity. This allows the magnitude of the composite regulation window ($V_{uspl}-V_{lsp4}$) to be reduced relative to prior regulators, thereby achieving improved voltage regulation.

Thus the present invention has been described with reference to particular embodiments in connection with a particular application. Those having ordinary skill in the art and access to the teachings of the present invention will recognize additional modifications and applications within the scope thereof. For example, the control circuit 25 may include electronics other than that included within controllable pulse generator 40 for selectively pulsing the shift register 50. Similarly, the invention is not limited to the particular embodiments of the window comparator 30 or switch array 60 disclosed herein. Those skilled in the art may utilize other circuits for sensing deviations in the bus voltage from a preselected voltage regulation window which may be suitable for a particular embodiment of the present invention. Additionally, shift registers of orders other than four may be substituted for the shift register 50 without departing from the scope of the present invention. It is therefore contemplated by the appended claims to cover any and all such modifications.

Accordingly,

What is claimed is:

1. An improved digital switching voltage regulator comprising:
   control circuit means for providing a first output voltage and at least one shift pulse when the voltage across a load operatively coupled to said regulator departs from a voltage regulation window by crossing an upper threshold voltage and for providing a second output voltage and at least one shift pulse when the voltage across said load departs from said regulation window by crossing a lower threshold voltage, said regulation window being defined by said upper and lower threshold voltages;
   bi-directional shift register means for generating a set of control voltages in response to said first or said second output voltage of said control circuit means and said shift pulse; and
   switchable current source means for providing a current to said load in response to said set of control voltages.

2. The regulator of claim 1 wherein said switchable current source means includes:
   an array of current sources for generating said current and
   an array of switches respectively coupled to said current sources for intermittently shunting at least a portion of said current away from said load in response to said set of control voltages.

3. The regulator of claim 2 wherein said control circuit means further includes:
   means for providing a reference voltage and
   window comparator means for providing said first output voltage when a first portion of the voltage across said load is greater than said reference voltage by a differential voltage proportional to a window voltage and for providing said second output voltage when a second portion of said load voltage is less than said reference voltage by said differential voltage.

4. The regulator of claim 3 wherein said control circuit means further includes controllable pulse generator means operatively coupled to said comparator means for producing said shift pulse.

5. The switching regulator of claim 4 wherein said controllable pulse generator means includes OR gate means for providing a pulse enable s in response to said first or said second output voltage and clocked pulse generator means for generating a plural series of said shift pulse while being addressed by said enable signal.

6. The switching regulator of claim 5 wherein said bi-directional shift register means includes a plurality of serially arranged data registers for storing said control voltages.

7. The switching regulator of claim 6 wherein each switch included within said array of switches is operatively coupled to one of said data registers.

8. The switching regulator of claim 7 wherein said bi-directional shift register means further includes means for serially shifting data within said registers in first and second directions in response to said first and second output voltages, respectively.

9. An improved digital switching voltage regulator comprising:
   means for providing a reference voltage;
   window comparator means for providing a first output voltage when a first portion of the voltage across a load coupled to said regulator is greater than said reference voltage by a differential voltage and for providing a second output voltage when a second portion of the voltage across said load is less than said reference voltage by said differential voltage;
   an OR gate coupled to said window comparator means for producing a pulse enable signal in response to said first or said second output voltage of said window comparator means;
   a clocked pulse generator coupled to said OR gate for generating a series of shift pulses while being addressed by said enable signal;
   bi-directional shift register means for generating a set of control voltages in response to said first or said second output voltage of said window comparator means and one of said shift pulses;
   an array of current sources for providing a current to said load; and
   an array of switches respectively coupled to said current sources for intermittently shunting at least a portion of said current away from said load in response to said set of control voltages.

10. A method of regulating the voltage across a load comprising the steps of:
   (a) providing a first output voltage and at least one first shift pulse when the voltage across said load departs from a voltage regulation window by crossing an upper threshold voltage and providing a second output voltage and at least one second shift pulse when said load voltage departs from said voltage regulation window by crossing a lower threshold voltage, said regulation window being defined by said upper and lower threshold voltages;
   (b) generating a first set of control voltages in response to said first output voltage and said first shift pulse;
   (c) generating a second set of control voltages in response to said second output voltage and said second shift pulse; and
   (d) providing a first current to said load in response to said first set of control voltages and providing a second current to said load in response to said second set of control voltages.

11. A method of regulating the voltage across a load comprising the steps of:
   (a) providing a reference voltage;
   (b) providing a first output voltage when a first portion of the voltage across said load is greater than said reference voltage by a differential voltage proportional to a window voltage and providing a second output voltage when said first portion of said load voltage is less than said reference voltage by said differential voltage;
   (c) producing at least one shift pulse in response to said first or said second output voltage;
   (d) generating a set of control voltages in response to said first or said second output voltage and said shift pulse;
   (e) supplying a current to said load; and
   (f) intermittently shunting at least a portion of said current away from said load in response to said control voltages.

12. An improved digital switching voltage regulator comprising:
   control circuit means for providing a first output voltage and at least one shift pulse when the voltage across a load operatively coupled to said regulator departs from a voltage regulation window by crossing an upper threshold voltage and for providing a second output voltage and at least one shift pulse when the voltage across said load departs from said regulation window by crossing a lower threshold voltage, said regulation window being defined by said upper and lower threshold voltages, said control circuit means including:
   means for providing a reference voltage,
   window comparator means for providing said first output voltage when a first portion of the voltage across said load is greater than said reference voltage by a differential voltage proportional to a window voltage and for providing said second output voltage when a second portion of said load voltage is less than said reference voltage by said differential voltage, and
   controllable pulse generator means operatively coupled to said comparator means for producing said shift pulse;
   bi-directional shift register means for generating a set of control voltages in response to said first or said second output voltage of said control circuit means and said shift pulse; and
   switchable current source means for providing a current to said load in response to said set of control voltages.

13. The switching regulator of claim 12 wherein said controllable pulse generator means includes OR gate means for providing a pulse enable signal in response to said first or said second output voltage and clocked pulse generator means for generating a plural series of said shift pulse while being addressed by said enable signal.

14. The switching regulator of claim 13 wherein said bi-directional shift register means includes a plurality of serially arranged data registers for storing said control voltages.

15. The switching regulator of claim 14 wherein each switch included within said array of switches is operatively coupled to one of said data registers.

16. The switching regulator of claim 15 wherein said bi-directional shift register means further includes means for serially shifting data within said registers in first and second directions in response to said first and second output voltages, respectively.

* * * * *

UNITED STATES PATENT AND TRADEMARK OFFICE
CERTIFICATE OF CORRECTION

PATENT NO. : 4,947,101

DATED : August 7, 1990

INVENTOR(S) : Michael J. McVey

It is certified that error appears in the above-identified patent and that said Letters Patent is hereby corrected as shown below:

Column 11, line 7, delete "s" and insert instead --signal--.

Signed and Sealed this

Thirty-first Day of March, 1992

Attest:

HARRY F. MANBECK, JR.

*Attesting Officer*  Commissioner of Patents and Trademarks